March 17, 1964     S. T. SCOTT     3,125,074
ROTARY INTERNAL COMBUSTION ENGINE
Filed Jan. 22, 1962     2 Sheets-Sheet 1
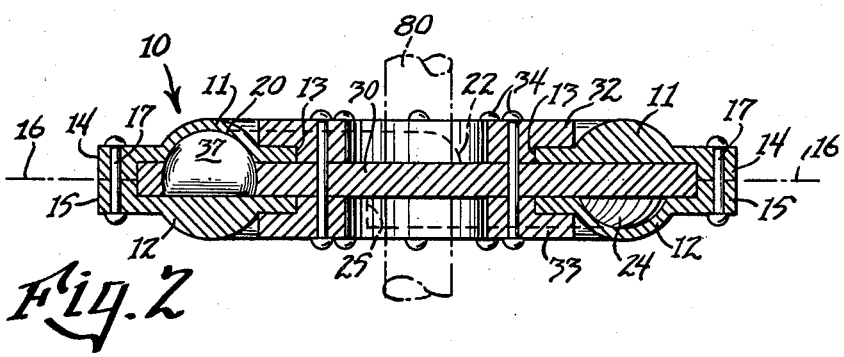
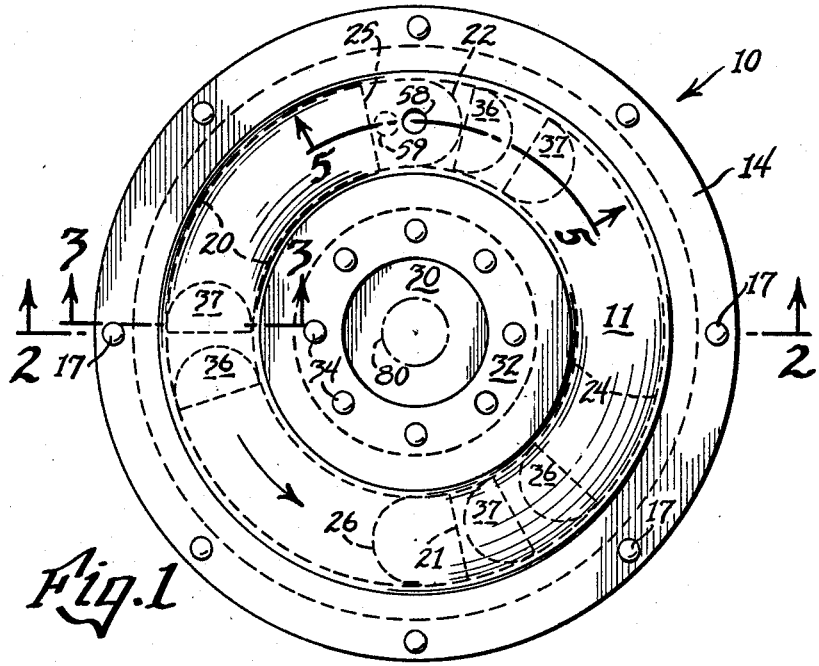
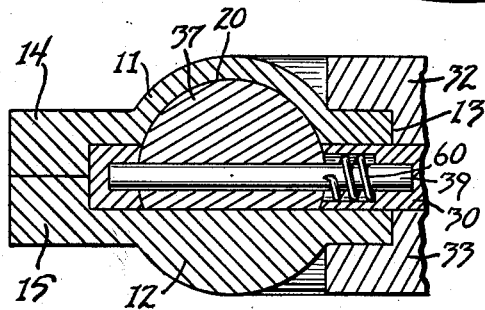
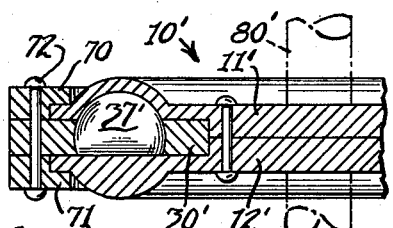
INVENTOR:
SAMUEL THEODORE SCOTT
BY
Harrington A. Lackey
ATTORNEY

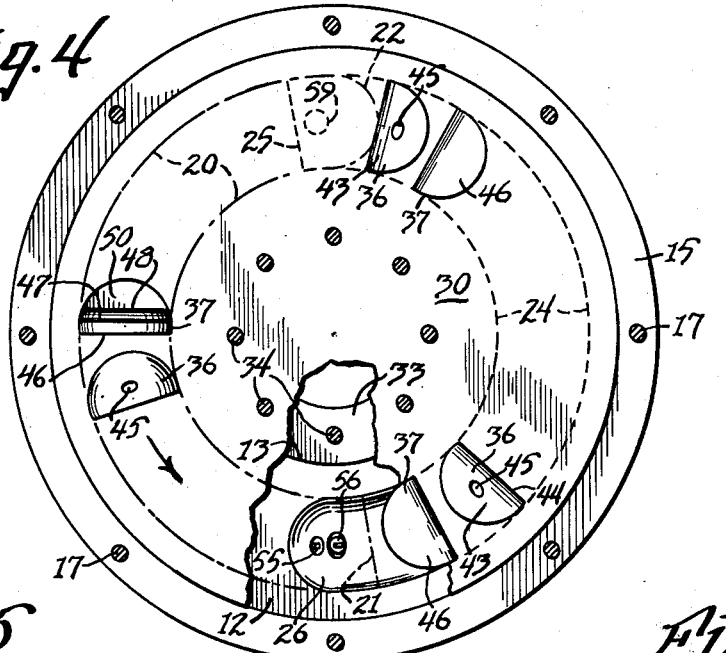

3,125,074
United States Patent Office
                                 Patented Mar. 17, 1964

3,125,074
ROTARY INTERNAL COMBUSTION ENGINE
Samuel Theodore Scott, 3613 Meadowbrook Ave.,
Nashville, Tenn.
Filed Jan. 22, 1962, Ser. No. 167,604
5 Claims. (Cl. 123—17)

This invention relates to a rotary internal combustion engine, and more particularly to such an engine having novel piston and chamber structures.

The conventional internal combustion engine, now in use, basically comprises one or more cylinders, each incorporating a reciprocating piston having a four-cycle stroke and connected through various linkages to the drive shaft to mechanically convert a reciprocating motion to a rotary motion. Although rotary internal combustion engines appear in the prior art, none of them have apparently met with much commercial success. Moreover, the structure of such rotary engines comprises basically an inner hub and an outer cylinder rotatable with respect to each other. A plurality of spaced valve members are pivoted to the periphery of the hub, so that they are pivotal in a radial plane to seal the space between the periphery of the hub and the inner surface of the cylinder. In this manner, the air is compressed by the pistons which are periodically pivoted radially outward and inwardly against the hub.

It is an object of this invention to overcome the disadvantages enumerated by providing a novel type rotary internal combustion engine which will produce a direct rotary drive without the necessity of converting from reciprocatory motion to rotary motion.

Another object of this invention is to provide a rotary internal combustion engine having a toroidal casing incorporating one or more firing chambers on one side of the centric plane of the casing and one or more alternating compression chambers on the opposite side of the centric plane of the casing, with pistons adapted to reciprocate laterally between the chambers for movement therethrough.

Another object of this invention is to provide a novel rotary internal combustion engine, which is more efficient and yet more economical than previous types of internal combustion engines.

Another object of this invention is to provide a rotary internal combustion engine comprising a toroidal casing incorporating staggered firing and compression chambers and a piston carrier for carrying pistons successively through the compression and firing chambers, in which the toroidal casing may remain stationary while the piston carrier is rotated, or vice versa.

Another object of this invention is to provide a rotary internal combustion engine incorporating a toroidal casing in which one or more compression chambers are formed laterally in one half of the casing and one or more firing chambers are formed in the other half of the casing staggered with respect to the compression chambers, and including pistons pivotally mounted on radial axes for reciprocably swinging between the successive chambers on opposite sides of the casing.

Further objects and advantages of the invention will be apparent from the following description taken in conjunction with the drawings, wherein:

FIG. 1 is a front elevation of the invention;
FIG. 2 is a section taken along the line 2—2 of FIG 1;
FIG. 3 is a section taken along the line 3—3 of FIG. 1;
FIG. 4 is a front elevation of the invention with the front section of the toroidal casing, including the compression chamber, removed, but with the compression chamber outlined in phantom, and a portion of the piston carrier broken away;

FIG. 5 is a section taken along the line 5—5 of FIG. 1, with the pistons in a slightly advanced position;
FIG. 6 is a section similar to FIG. 5 showing a further advanced position of the pistons compressing the air in the compression chamber;
FIG. 7 is a section similar to FIG. 6 in a further advanced position showing the compressed air entering the firing chamber and being mixed with the fuel;
FIG. 8 is a section similar to FIG. 7 showing the firing of the gaseous charge;
FIG. 9 is a section similar to FIG. 2 showing a modification of the invention.

Referring now to the drawings in more detail, the rotary internal combustion engine made in accordance with this invention, comprises a toroidal casing 10 comprising a pair of opposing sections, a front section 11 and a rear section 12. The casing 10 has an annular opening 13 in the center thereof. The opposing faces of the sections 11 and 12 are spaced apart, except at the outer peripheries, where they are provided with corresponding annular flanges 14 and 15, which abut flush against each other in the centric plane 16 of the casing 10. The sections 11 and 12 are secured together by means of the bolts 17 extending through the flanges 14 and 15.

A circumferential recess 20 of uniform cross-section, and preferably having the shape of a circular segment, is formed in the front section 11 and extends through an arc slightly greater than 180°. The recess 20 has a radial end wall 21 and a spherical end wall 22, as disclosed by the hidden lines of FIG. 1, the phantom lines of FIG. 4, and the solid lines of FIGS. 5–8.

Another circumferential recess 24 of identical cross-section is formed in the rear section 12. The recess 24 also extends circumferentially through an arc slightly greater than 180° from a flat radial end wall 25 to a spherical end wall 26, as disclosed by the hidden lines in FIG. 1, by the hidden and solid lines of FIG. 4, and by the solid lines of FIGS. 5–8. The recesses 20 and 24 are so arranged that the spherical end wall 22 will overlap the flat end wall 25, and the spherical end wall 26 will overlap the end wall 21. Thus, adjacent end portions of the recesses 20 and 24 will laterally oppose each other to afford communication between the recesses 20 and 24.

A piston carrier 30, comprising a disc of uniform thickness and having a diameter susbtantially equal to the inner diameters of the flanges 14 and 15, is mounted for rotation between the sections 11 and 12, as best disclosed in FIG. 2. The peripheral edge of the piston carrier 30 is in slidable but gas-sealing engagement with the inner surfaces of the flanges 14 and 15. The front and rear surfaces of the piston carrier 30 are also slidable but gas-sealing with respect to the abutting surfaces of the respective sections 11 and 12, and serve as walls for closing the respective recesses 11 and 12 to form respectively a compression chamber 20 and a firing chamber 24. Although not disclosed in the drawings, it will be understood that any type of effective gas-sealing means may be employed between the sliding surfaces, such as compression rings.

A pair of opposing retainer rings 32 and 33 having outer peripheral recesses, are mounted on opposite sides of the piston carrier 30 by means of the bolts 34. The outer peripheral recesses of the retainer rings 32 and 33 are adapted to provide a raceway for the inner periphery 13 of the casing 10.

In the preferred form of this invention, the piston carrier 30 is adapted to carry one or more sets of pistons. Each set comprises a first or power piston 36, and a second or compressor piston 37. Each of the pistons 36 and 37 are spherical segments of peculiar shape adapted to their particular function. Each of the pistons 36 and 37 is pivotally journaled on a corresponding pin 38 and 39, the axis of each of which is radial within the centric plane 16, and mounted in corresponding openings 40 and 41 within the piston carrier 30. The power piston 36 has a pair of flat faces 43 and 44, which are preferably normal to each other. Moreover, a tubular valve 45 is formed through the piston 36 from the face 43 to the rear curved portion of the piston 36, as disclosed in the drawings. It will be noted that in FIGS. 6 and 7, the valve 45 permits the passage of air therethrough in those particular positions of the piston 36. It will also be noted that the piston 36 is adapted to pivot about its pin 38 in a maximum arc of approximately 90°.

The compressor piston 37 is substantially a disc segment having a front flat face 46 and a parallel rear flat face 47 with a rounded base portion 48. The opening 41 is adapted to accommodate the movement of the rounded base portion 48. An adjacent recess 50 is adapted to accommodate the extended portion of the piston 37 with the flat face 47 resting flush against the side wall of the recess 50, and the front flat face 46 being flush with the corresponding side surface of the piston carrier 30, as disclosed in FIGS. 5 and 8.

In order to introduce the fuel into the firing chamber 24, a fuel nozzle 55 is mounted in the casing section 12 and recessed in the end wall 26 to introduce fuel into the firing chamber 24 without obstructing the movements of the piston. A spark plug 56 or other type of ignition means is also recessed in the end wall 26 in order to fire the mixture of fuel, such as gasoline, and the compressed air from the compression chamber 20.

Mounted in the rear end of the compression chamber 20 is an air intake valve 58, and mounted in the front end of the firing chamber 24 adjacent the end wall 25 is an exhaust valve 59.

Although the pistons 36 and 37 will be automatically pivoted from the compression chamber 20 into the firing chamber 24 when their respective forward faces 43 and 46 contact the end wall 21, and the same pistons 36 and 37 will be returned to the compression chamber 20 from the firing chamber 24 when the forward face 44 and the base portion 48 contact the end wall 25, a coil spring 60 (FIG. 3) may be formed around either or both pivot pins 38 or 39 to bias the corresponding pistons into either the compression chamber 20 or the firing chamber 24.

The invention thus far described is designed principally for a stationarily mounted toroidal casing 10 and a rotatable piston carrier 30, the operation of which is as follows:

Assuming that the engine has been started, by any conventional means for starting an internal combustion engine, the piston carrier 30 rotates in the direction of the arrows disclosed in the drawings, relative to the toroidal casing 10, which is preferably stationary. As disclosed in FIG. 5, when the piston 36 reaches the end of the firing chamber 24, its face 44 will engage the end wall 25 and rotate the piston 36 from its dashed-line position to its solid-line position in FIG. 5. If the pin 38 is provided with a coil spring 60, such as that disclosed in FIG. 3, the piston 36 will be rotated to the solid line position of FIG. 5 as soon as its face 43 clears the solid part of the section and fully registers with the spherical end wall 22. At this point, the spring 60 will rotate the piston 36 immediately prior to the face 44 engaging the end wall 25. The piston 36 then begins its forward movement through the compression chamber 20.

Immediately thereafter, the compressor piston 37 is thrust from its recess 50 into the compression chamber 20 by the engagement of the rounded portion 48 with the end wall 25, or by the coil spring 60, if provided. Air is freely introduced into the compression chamber 20 through the intake valve 58 until the compressor piston 37 advances to close the valve 58 and completely seal the compression chamber 20 in advance of the piston 37. The continued forward movement of the piston 37, indicated in FIG. 6, will compress the air within the chamber 20 toward the flat end wall 21. The air in front of the piston 36 merely equalizes itself on both sides of the valve passage 45.

When the piston 36 reaches the forward end of the compression chamber 20, the forward face 43 engages the end wall 21 to thrust the piston 36 pivotally about its pin 38 into the firing chamber 24. As soon as the rear end of the valve 45 clears the piston carrier 30 and opens into the firing chamber 24 behind the piston 36, the compressed air immediately flows from the compression chamber 20 in advance of piston 37 through the valve 45 and into the firing chamber 24, as illustrated in FIG. 7. At this time fuel, such as gasoline, is introduced through the nozzle 55 into the firing chamber 24 to be mixed with the compressed air.

Immediately thereafter, the forward opening of the valve 45 passes beyond the end wall 21 to close the valve 45. As soon as the rounded face 48 of the piston 37 passes beyond the solid portion of section 12 to register with the spherical end wall 26, the compressed air in advance of the piston 37 will force the piston 37 back and down into its recess 50. The spark plug 56 is timed to ignite the gaseous mixture in the portion of the firing chamber 24 behind the piston 36 to produce an explosive impulse driving the piston 36 and consequently the piston carrier 30 forward through the toroidal casing 10.

When the piston 36 has advanced to the end wall 25 and begins to rotate into the compression chamber 20, the gaseous products of combustion will be discharged through the exhaust valve 59. This completes the cycle of operation for one set of valves 36 and 37.

It will be noted that the drawings disclose three sets of pistons 36 and 37, spaced 120° apart in their corresponding positions within the toroidal casing 10. It will also be noted that only one compression chamber 20 and one firing chamber 24 have been disclosed. However, it will be understood that by increasing the number of sets of pistons and the number of compression and firing chambers, the power of the engine may be increased. However, in increasing the number of compression and firing chambers, the overlapping relationship between the compression chambers 20 and the firing chambers 24 must be maintained, even though the length of the chambers may be reduced.

FIG. 9 discloses in a sectional view similar to FIG. 2, a modified form of toroidal casing 10′ in which the sections 11′ and 12′ are solid and abut across the central portion of the casing 10′. On the other hand, the piston carrier 30′ is annular to fit between mating recessed portions of the sections 11′ and 12′, and is adapted to be stationarily mounted on the ring-flanges 70 and 71 by means of bolts 72. The ring flanges 70 and 71 provide a bearing or raceway for the peripheral edges of the sections 11′ and 12′. Thus, in the modification disclosed in FIG. 9, the piston carrier 30′ remains stationary, while the toroidal casing 10′ rotates. However, the relative movement of the casing 10′ and the piston carrier 30′, as well as the pistons, are relatively the same as in the previous modification.

It will also be understood that the rotary motion developed by the engine may be imparted to a rotary shaft 80, shown in phantom in FIG. 2, coaxially fixed to the piston carrier 30. The rotary motion developed by the engine disclosed in FIG. 9, is imparted to a similar rotary shaft 80′ coaxially fixed to sections 11′ and 12′.

It is believed that an engine made in accordance with this invention incorporating pistons which pivot about radial axes from side to side of the centric plane of the toroidal casing, would be more efficient since energy will not be required to withdraw the pistons against the tremendous centrifugal force developed at the high speeds contemplated by this invention.

Moreover, this invention has many advantages over the conventional reciprocable piston-type engine, since a reciprocating piston, by its very nature, must use up energy in slowing down, stopping and reversing its direction for every stroke of the engine. Moreover, this rotary type engine requires no connecting rods, crank shafts or any other type of mechanical linkages between the piston carrier and the rotary drive shaft. The engine develops rotary power which can be directly transmitted to a rotary shaft. Moreover, the pistons travel in a continuous circular direction and may travel at a continuous angular velocity without periodic increases and decreases in speed and reversal of direction.

It will be apparent to those skilled in the art that various changes may be made in the invention without departing from the spirit and scope thereof, and therefore the invention is not limited by that which is shown in the drawings and described in the specification, but only as indicated in the appended claims.

What is claimed is:

1. A rotary internal combustion engine comprising:
   (a) a toroidal casing comprising opposed first and second sections spaced apart symmetrically about a centric plane.
   (b) an annular piston carrier in relative rotational engagement between said sections,
   (c) a first recess in said first section to form a compression chamber with one side of said piston carrier,
   (d) a second recess in said second section to form a firing chamber with the other side of said piston carrier,
   (e) said recesses being alternately spaced circumferentially of said casing and having overlapping end portions,
   (f) pistons pivotally mounted about radial axes in said piston carrier for movement between and through said compression and firing chambers,
   (g) means for pivoting said pistons between one operative position in said compression chamber and another operative position in said firing chamber,
   (h) an air intake valve in said compression chamber,
   (i) an exhaust valve in said firing chamber, and
   (j) means to synchronously fire a gaseous charge in said firing chamber for driving said pistons circumferentially relative to said toroidal casing.

2. The invention according to claim 1 in which said pistons comprise a power piston and compressor piston, said power piston being adapted to seal said firing chamber, and said compressor piston being adapted to seal said compression chamber.

3. A rotary internal combustion engine comprising:
   (a) a toroidal casing comprising opposed first and second sections spaced apart symmetrically about a centric plane,
   (b) an annular piston carrier in relative rotational engagement between said sections,
   (c) a first recess of uniform cross-section in said first section to form a compression chamber with one side of said piston carrier,
   (d) a second recess having the same uniform configuration as said first recess in said second section to form a firing chamber with the other side of said piston carrier,
   (e) said recesses being alternately spaced circumferentially of said casing and having overlapping end portions,
   (f) a power piston and a compressor piston,
   (g) means for pivotally mounting said pistons about radial axes adjacent each other in said piston carrier, and for pivotal movement through said carrier,
   (h) said compressor piston having the same configuration as the cross section of said compression chamber in a first position,
   (i) a recess in said piston carrier for receiving said compressor piston in a second position,
   (j) said power piston being adapted to be carried through said compression chamber in a first position,
   (k) said power piston having the same configuration as the cross-section of said firing chamber in a second position,
   (l) a valve in said power piston for communicating said compression chamber with said firing chamber when said power piston is in its second position and said compressor piston is in its first position,
   (m) means for pivoting said power piston and said compresor piston between their respective first and second positions,
   (n) an air intake valve in said compression chamber,
   (o) an exhaust valve in said firing chamber, and
   (p) means to synchronously fire a gaseous charge in said firing chamber to drive said power piston circumferentially and relative to said toroidal chamber.

4. The invention according to claim 3 in which the cross-sections of said recesses comprise circular segments and said pistons comprise spherical segments.

5. The invention according to claim 3 including spring means for biasing said pistons into said compression chamber.

References Cited in the file of this patent
UNITED STATES PATENTS
1,464,408   Collier _____ Aug. 7, 1923